(12) United States Patent
Gorman et al.

(10) Patent No.: US 12,503,835 B2
(45) Date of Patent: Dec. 23, 2025

(54) REMOVABLE CAMERA MOUNTING SYSTEM

(71) Applicant: Caterpillar Inc., Peoria, IL (US)

(72) Inventors: Corey L. Gorman, Peoria, IL (US); David E. Cooper, Chillicothe, IL (US); Brad R. Van De Veer, Washington, IL (US); Justin L. Steinlage, Mackinaw, IL (US)

(73) Assignee: Caterpillar Inc., Peoria, IL (US)

( * ) Notice: Subject to any disclaimer, the term of this patent is extended or adjusted under 35 U.S.C. 154(b) by 175 days.

(21) Appl. No.: 18/455,245

(22) Filed: Aug. 24, 2023

(65) Prior Publication Data
US 2025/0067024 A1   Feb. 27, 2025

(51) Int. Cl.
*G03B 17/56*   (2021.01)
*B60R 1/078*   (2006.01)
*E02F 9/26*    (2006.01)

(52) U.S. Cl.
CPC ............... *E02F 9/26* (2013.01); *B60R 1/078* (2013.01); *G03B 17/561* (2013.01)

(58) Field of Classification Search
CPC .......... G03B 30/00; B60R 1/078; B60R 11/04
See application file for complete search history.

(56) References Cited

U.S. PATENT DOCUMENTS

| | | | |
|---|---|---|---|
| 3,014,751 A * | 12/1961 | Smith | B23Q 3/1546 335/295 |
| 10,894,515 B1 | 1/2021 | Li | |
| 2015/0172518 A1 | 6/2015 | Lucas et al. | |
| 2015/0334271 A1 * | 11/2015 | Hartig | F16M 11/06 348/148 |
| 2015/0381859 A1 * | 12/2015 | Cover | H04N 23/51 348/374 |
| 2016/0191863 A1 * | 6/2016 | Minikey, Jr. | H04N 23/57 348/148 |
| 2017/0057423 A1 * | 3/2017 | Wang | B60R 11/04 |
| 2018/0223503 A1 | 8/2018 | Imano | |
| 2021/0218934 A1 | 7/2021 | Gorgees | |
| 2021/0235019 A1 | 7/2021 | Tonkin | |
| 2021/0245678 A1 | 8/2021 | Smits | |
| 2022/0220708 A1 | 7/2022 | Smits | |
| 2022/0316172 A1 | 10/2022 | Cobb | |

FOREIGN PATENT DOCUMENTS

| | | |
|---|---|---|
| CN | 102117066 A | 7/2011 |
| CN | 218055071 U | 12/2022 |
| JP | 2022094699 A | 6/2022 |
| KR | 10-2501929 B1 | 2/2023 |
| WO | 2020229524 A1 | 11/2020 |

OTHER PUBLICATIONS

Written Opinion and International Search Report for Int'l. Patent Appln. No. PCT/US2024/039103, mailed Nov. 4, 2024 (13 pgs).

* cited by examiner

*Primary Examiner* — Leon W Rhodes, Jr.

(57) ABSTRACT

A removable camera mounting system for a mobile industrial machine is disclosed. The removable camera mounting system includes a camera housing having a plurality of walls. A camera unit is mounted within the camera housing. A light unit is also mounted within the camera housing. An exterior of one of the plurality of walls of the camera housing includes one or more magnets.

17 Claims, 5 Drawing Sheets

REMOVABLE CAMERA MOUNTING SYSTEM

TECHNICAL FIELD

The present disclosure relates generally to a mounting system, and more particularly, to a camera and a light mounting system for an industrial machine.

BACKGROUND

Industrial machines having cameras mounted thereon have been known for many years. In the case of mobile industrial machines used in construction, mining, and similar industries, cameras have become increasingly desirable, or mandatory, to (1) enable an operator to view parts of the machine and the work area around the machine which are otherwise out of the operator's field of view; (2) support partially or fully autonomous operation of the machine; or (3) support remote control of the machine. As the industry strives for higher efficiency and improved situational awareness, there is a desire for providing additional visual information to both on-board and off-board operators and observers.

A typical blind spot may occur at a work-tool as elements of the machine linkages may be obscured during normal operation or by conditions around the machines (e.g., weather conditions, debris, materials, etc.). In one example, the number of cameras on the machine linkages may be increased to address the blind spot issues (e.g., multiple cameras may be positioned on the boom assembly of an excavator for better visibility of the work-tool and its immediate surrounding). However, fixedly attaching multiple cameras to the machine linkages may impact work tool movement, and the cameras may be subject to increased risk of damage as machine linkages typically make contact with the ground and/or other objects. It is also technically challenging to integrate the cameras placed on the constantly moving machine linkages with the control system of the machine. In addition, the typical camera mounting system is rigidly secured and not amenable to relocation of cameras to desired blind spots unique to a particular job, operator, or observer.

U.S. Patent Application Publication No. 2022/0220708, published on Jul. 14, 2022 ("the '708 publication"), describes an excavator including a holding device that includes a camera, and the holding device. The holding device of the '708 publication is removable, however, the system does not contemplate the problems of damage to the camera due to the harsh environment and tasks of an excavator.

The system of the present disclosure may solve one or more of the problems set forth above and/or other problems in the art. The scope of the current disclosure, however, is defined by the attached claims, and not by the ability to solve any specific problem.

SUMMARY

In one aspect, a removable camera mounting system for a mobile industrial machine includes a camera housing having a plurality of walls, and a camera unit and a light unit are mounted within the camera housing. The exterior of one of the plurality of walls of the camera housing includes one or more magnets.

In another aspect, a removable camera mounting assembly for a mobile industrial machine includes a camera housing having a plurality of walls. One of the plurality of walls includes one or more magnets. A camera unit is mounted within the camera housing. A cam lever with a cam movable to extend beyond a wall having one or more magnets.

In yet another aspect, a removable camera mounting assembly includes a camera housing having a plurality of walls. One of the plurality of walls of the camera housing includes one or more magnets. A camera sub-housing is attached to a wall opposite to a wall with one or more magnets. A light unit is mounted to the camera housing. A cam lever with a cam movable to extend beyond the wall having one or more magnets.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
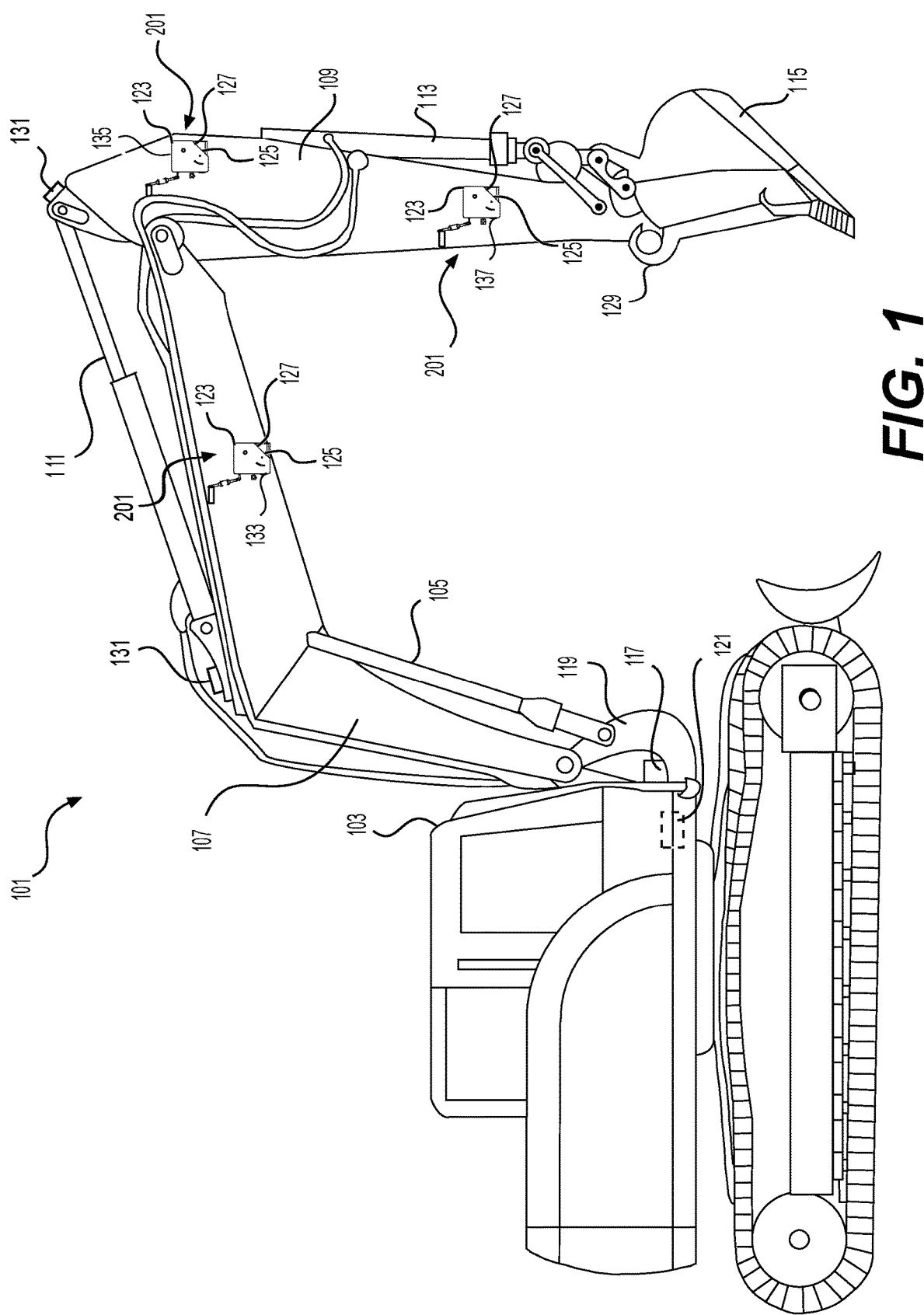
FIG. 1 illustrates an exemplary camera mounting system removably fastened to a mobile industrial machine, according to aspects of the disclosure.

FIG. 1 illustrates exemplary camera mounting systems 201 removably fastened to machine linkages of an industrial machine. Although FIG. 1 illustrates machine 101 as being an excavator, machine 101 may include any type of industrial machine, such as a mobile industrial machine, and/or industrial machines having moving work implements. For example, excavator machine 101 may be another type of digging machine (e.g., a backhoe, dozer, trencher, dragline, a loading machine (e.g., wheeled or tracked loader, an excavator, a cable shovel, a stack reclaimer, or any other similar machine), a hauling machine (e.g., articulated truck, an off-highway truck, an on-highway dump truck, a wheel tractor scraper, or any other similar machines), or any other type of machine where camera feeds are desired.

Machine 101 may include an engine (not illustrated in FIG. 1), cabin 103, first hydraulic actuator 105, a boom 107, a stick 109, second hydraulic actuator 111, third hydraulic actuator 113, implement 115 (illustrated as bucket 115, for example), boom link 117 fixedly connected to cabin 103, swing casting 119 fixedly connected to an end of boom 107 and to boom link 117, and control system 121. Although FIG. 1 illustrates bucket 115 as an example implement, other work implements may be used, such as a drill, cutters, a breaker, a scraper, etc.

Camera mounting systems 201 of machine 101 may include a camera housing 123 removably attached, via one or more magnets, to a sidewall of the machine linkage (e.g., boom 107, a stick 109) of machine 101. Camera housing 123 is configured to accommodate camera 125 to capture, in real-time or near real-time, images (e.g. video images) of a desired environment and/or blind spots during movements of the machine linkages. Camera housing 123 is also configured to accommodate light unit 127 that projects a light beam toward the field-of-view of camera 125. FIG. 1 shows three camera mounting systems 201 positioned at locations 133, 135, and 137 of the stick 109 and boom 107, however, it should be understood that there may be more or less than three camera mounting systems 201, and they may be placed anywhere on the machine 101.

Figure 2:
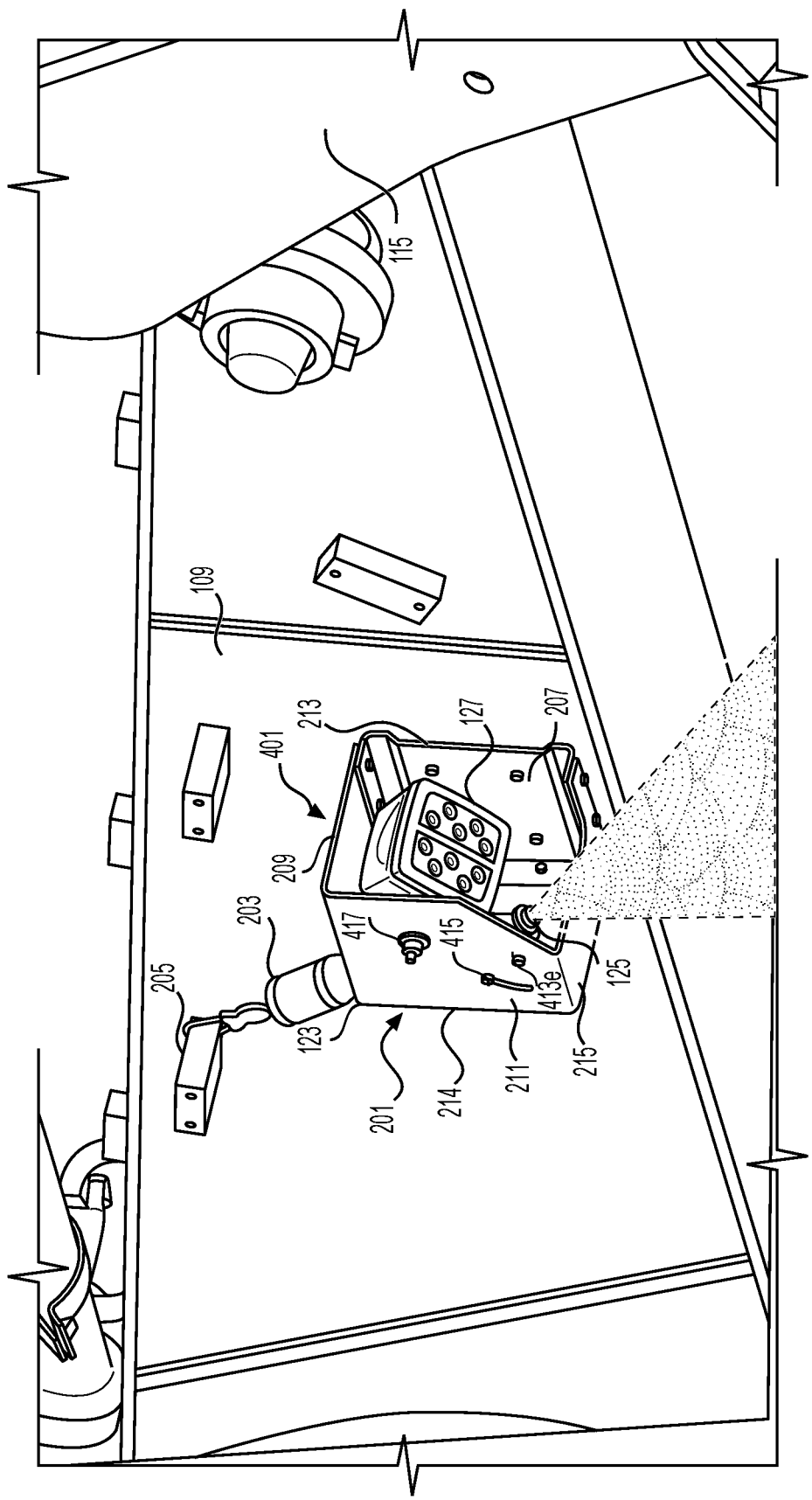
FIG. 2 is an enlarged view of the exemplary mounting system of FIG. 1 removably fastened to the machine.

FIG. 2 illustrates an enlarged view of a camera mounting system 201 that is removably fastened to the machine linkage (e.g., stick 109) of machine 101. The camera housing 123 may include a plurality of walls forming a generally cube shape with an open window 207. For example, the camera housing 123 may include a top wall 209, two sidewalls (e.g., a left sidewall 211 and a right sidewall 213), a back wall 214, and a bottom wall 215 structured to form a cavity that receives camera 125 (e.g., a still camera or video camera) and light unit 127. The window 207 may be formed by excluding a front wall, and removing portions of the left or outer sidewall 211 and the bottom wall 215. It is noted that window 207 could be larger or smaller than shown in FIG. 2. The top wall 209, bottom, the two sidewalls 211 and 213, and the back wall 214 are sized to completely cover or enclose camera 125 and light unit 127 such that no portions of the camera 125 or light unit 127 extend past the window. However, it should be understood that the configuration of the camera housing 123 may vary per requirements (e.g., camera housing 123 may include additional walls or may exclude one or more walls).

Figure 3:
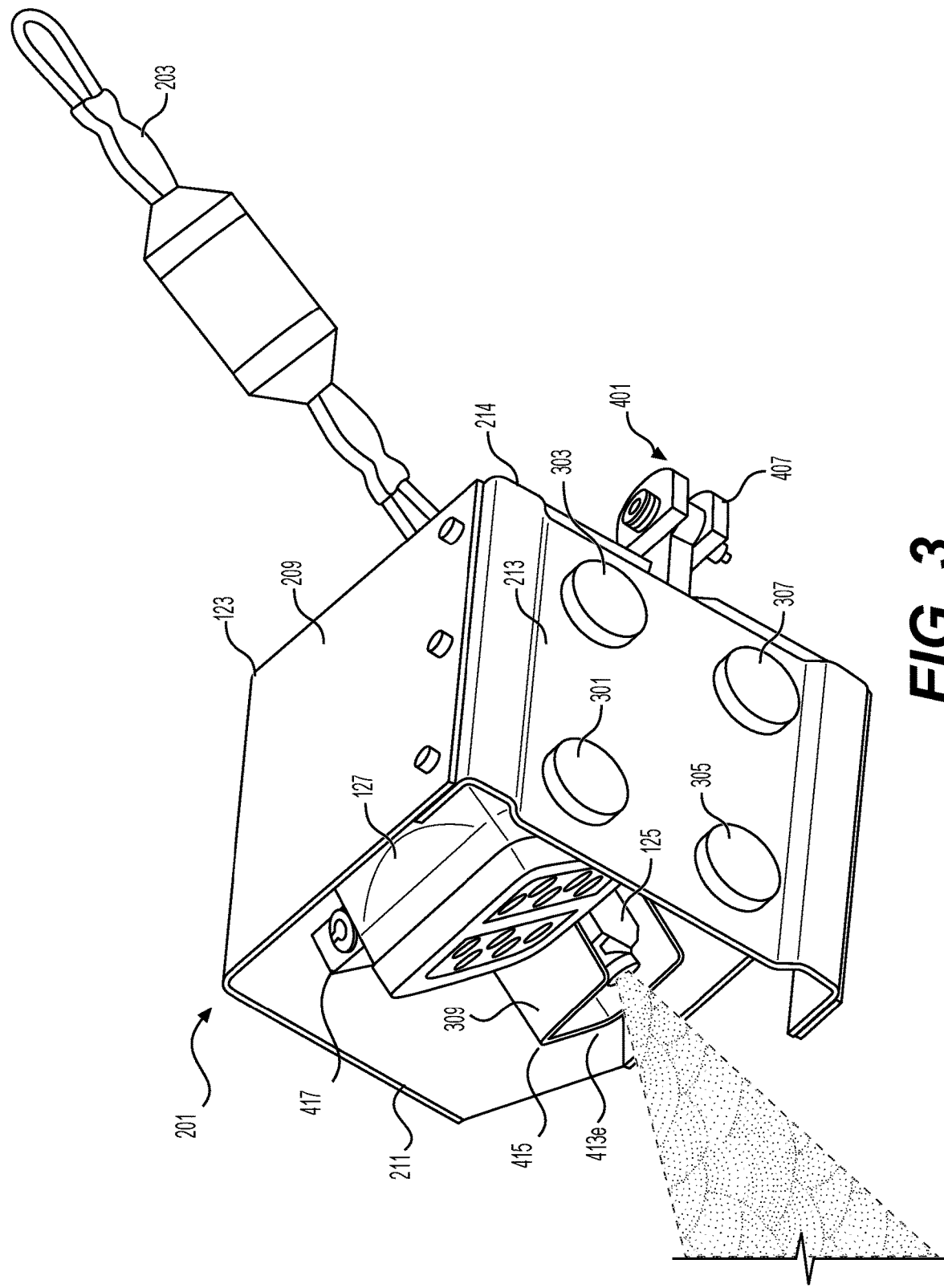
FIG. 3 is a side view of the exemplary mounting system of FIG. 1.

FIG. 3 depicts a side view of camera mounting system 201. Camera housing 123 is removably fastened to the outer side of machine 101 (e.g., stick 109), for example by means of magnets 301, 303, 305, 307. However, it should be understood that the number of magnets may be increased or decreased per requirements. As depicted, four magnets 301, 303, 305, and 307 weighing approximately 100 pounds each are fixedly attached to the sidewall 213 of camera housing 123. These magnets have a higher clamping force than a combined weight of the camera housing 123 (e.g., housing 123 with the camera 125 and the light unit 127). These magnets attach camera housing 123 to the exterior of machine 101 in a way that it may be non-destructively removed and repositioned at a different location of machine 101. For example, the magnets attach camera housing 123 at an optimal location, such that during operation of the machine 101, camera 125 has an unobstructed view of certain desired spots or blind spots and the surrounding environment. As discussed in further detail below, camera housing 123 includes a cam lever system 401 to assist in detaching, and repositioning camera housing 123 to a desired location of machine 101. The cam lever system 401 with a cam 407 is movable to extend beyond the sidewall 213 having one or more magnets.

Still referring to FIG. 3, camera housing 123 includes a c-shaped sub-housing or sub-assembly 309 that is selectively movably mounted, via fastening mechanisms, to camera housing 123 to accommodate and hold camera 125. However, it should be understood that the c-shaped sub-assembly 309 may be formed in any other shapes and sizes to house different cameras. As discussed in further detail below, the c-shaped sub-assembly 309 is attached to camera housing 123 via fasteners (e.g. bolt and nut assemblies 415 and 413e (FIGS. 2 and 4)). These fasteners may facilitate a rotation, pivoting, or tilting of the c-shaped sub-assembly 309 (e.g., one axis of adjustments about a longitudinal axis of bolt and nut assembly 413e by loosening and tightening assembly 415). The c-shaped sub-assembly 309 may exclude a front wall to allow the front face of camera 125 to be exposed when partially enclosed by camera housing 123. The c-shaped sub-assembly 309 may also exclude a back wall to allow camera 125 to be connected to power and transmission lines via aperture 411 (FIG. 4) at the back wall 214 of camera housing 123. Camera 125 may be fastened to the c-shaped sub-assembly 309 by means of magnets or other fastening mechanisms (e.g. bolt and nut fasteners (not shown)), and can be attached for selective repositioning within c-shaped housing or sub-assembly 309.

Figure 4:
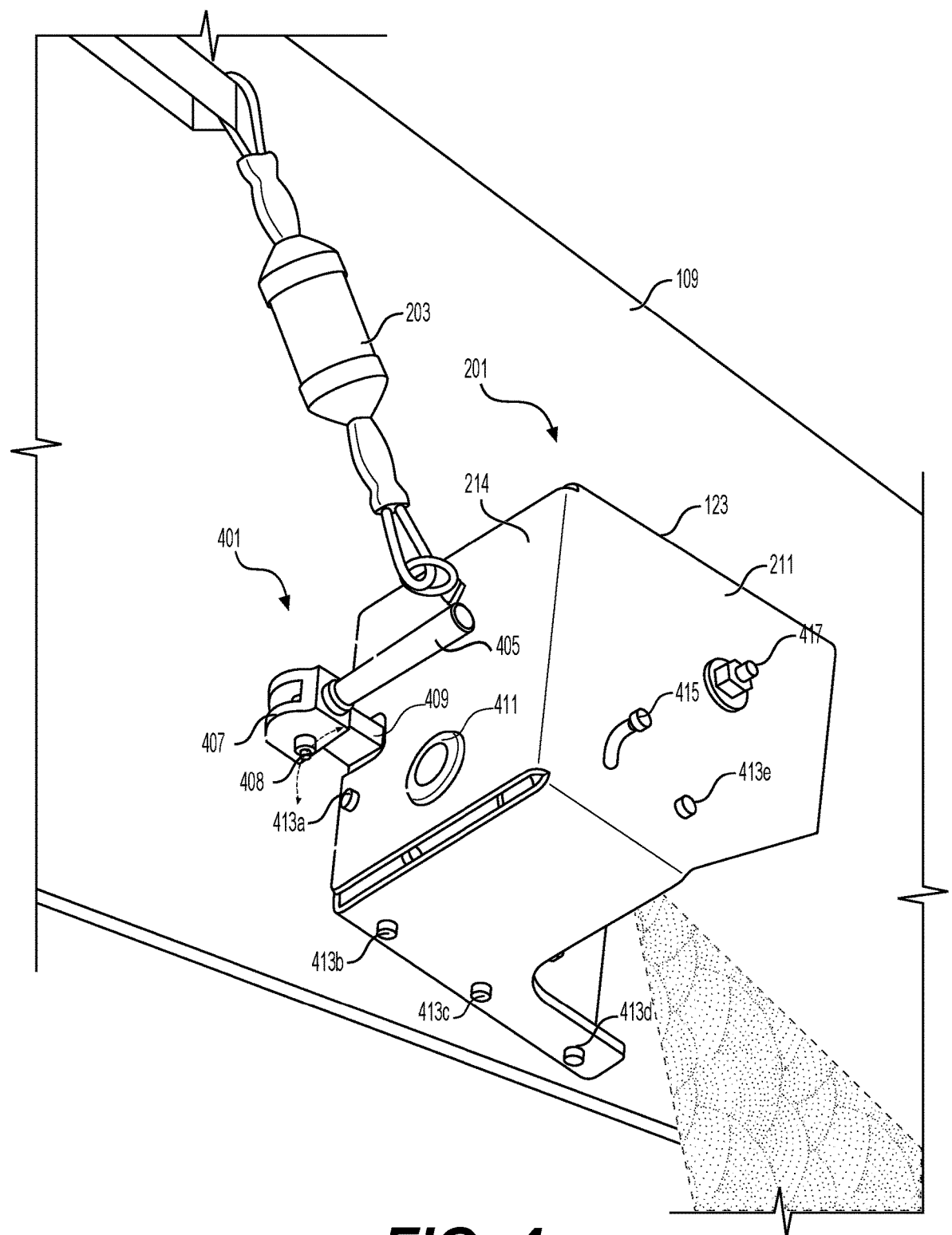
FIG. 4 is a rear view of the exemplary mounting system of FIG. 1.

FIG. 4 illustrates a rear view of camera mounting system 201. As shown, cam lever system 401 is attached to the back wall 214 of camera housing 123 at a corner between back wall 214 and magnet sidewall 213. The cam lever system is configured to assist in detaching camera housing 123 from the exterior of machine 101 (e.g., stick 109). In one instance, the cam lever system 401 includes a lever or handle 405 and a cam 407. The cam 407 may be u-shaped with one side opened to surround the outer periphery of boss 409 formed at the back wall 214 of camera housing 123. The cam 407 has a coupling portion (e.g., through holes) at the opened portion to receive fasteners (e.g., bolt and nut 408) to attach the cam 407 to boss 409. In one example, a user may utilize the cam lever system 401 to detach (or unstick) and/or readjust camera housing 123 on the exterior surface of machine 101 by rotating the handle 405 until the cam 407 contacts a wall of the machine 101, and then continued rotation of the handle 405 and cam 407 until the magnetic attraction of magnets 301-307 (FIG. 3) is overcome and the camera housing is easily removed from the machine 101. The configuration of the cam 407 and handle 405 may be formed of different shapes than that shown in FIG. 4.

As noted above, the back wall 214 of camera housing 123 may include an aperture 411 for receiving electrical wirings (e.g., power and transmission cables, etc.) of the camera 125 and the light unit 127. For example, when camera housing 123 is mounted on machine 101, an electrical link (wires or cables) such as a communication link or a power connection may be run between the camera 125, the light unit 127, and the control system 121 of machine 101, and through aperture 411. It is contemplated that wireless communication may also be used to connect camera 125 and light unit 127 with the control system 121.

Figure 5:
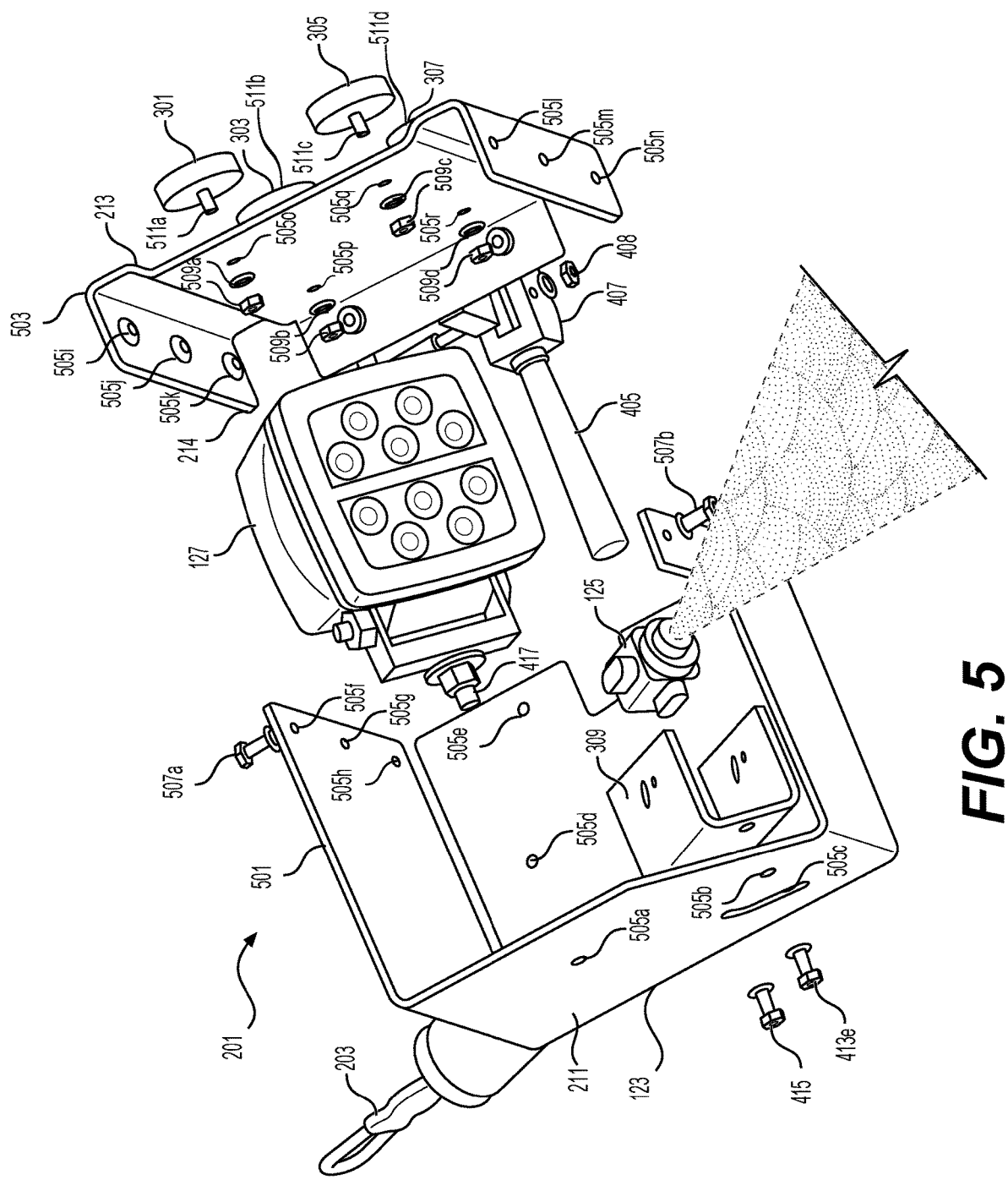
FIG. 5 is an exploded view of the exemplary mounting system of FIG. 1.

FIG. 5 depicts an exploded view of the camera mounting system 201. In one instance, camera housing 123 includes a first housing portion 501 and a second housing portion 503 that are detachable. In one instance, the walls of camera housing 123 may include a plurality of apertures (e.g., apertures 505a-505r) to receive various fastening mechanisms. It should be appreciated that additional and/or fewer apertures may be formed on the walls of camera housing 123 to receive the fastening mechanisms. In one instance, the first housing portion 501 may include fastener holes or other engagement mechanisms configured to mate with corresponding fastener holes or other engagement mechanisms of the second housing portion 503. The engagement mechanisms may include various suitable devices and/or features for coupling the first housing portion 501 to the second housing portion 503, for example, bolts and nuts, magnets, an adhesive, a clip, a clasp, a tab, a hook, a raised or recessed surface, screws (e.g., 507a, 507b), and more.

The first housing portion 501 is sized, shaped, and/or configured to receive the c-shaped sub-assembly 309 and the camera 125. As noted above, the c-shaped sub-assembly 309 is selectively mounted to the sidewall 211 on the first housing portion 501 by bolt and nut of assemblies 415 and 413e through apertures 505b and arc-shaped slot 505c. These bolts and nuts may facilitate a rotation, pivoting, or tilting of the c-shaped sub-assembly 309 about axis 505b (e.g., one axis of adjustments about assembly 413e by loosening and tightening assembly 415). The camera 125 may be selectively mounted within the c-shaped sub-assembly 309 via various coupling mechanisms (e.g., a magnet, an adhesive, a clip, a clasp, screws and blots, etc.) with a certain degree of freedom of movement. In one instance, camera 125 together with the c-shaped sub-assembly 309 may rotate, tilt, or pivot about axis 505b by adjusting assemblies 415 and 413c. In another instance, the camera 125 may independently rotate, tilt, or pivot within the c-shaped sub-assembly 309 to capture a desired field-of-view. Similarly, the light unit 127 is selectively mounted to sidewall 211 on the first housing portion 501 by means of bolt and nut of assemblies 417 through aperture 505a. These bolts and nuts may facilitate a rotation, pivoting, or tilting of the light unit 127 about axis 505a (e.g., one axis of adjustments by loosening and tightening assembly 417).

In one instance, magnets 301-307 are selectively mounted to the sidewall 213 on the second housing portion 503. The apertures 5050-505q are sized and shaped to receive protrusions 511a-511d of the magnets 301-307, and the bolt and nut assemblies 509a-509d may fasten the protrusions 511a-511d of the magnets 301-307 to the sidewall 213. In another instance, the sidewall 213 may comprise pre-formed depressions (e.g., concave dimples) to house magnets 301-307.

Referring back to FIG. 2, camera housing 123 includes a tether 203 for additional support (e.g., to prevent camera housing 123 from falling in case the camera housing 123 is impacted with such force as to overcome the connecting force of magnets). The first end of tether 203 is fastened to the sidewall of camera housing 123 (e.g., flanges on the back wall of camera housing 123 configured to interlock with the first end of tether 203) and the second end of the tether is fastened to the sidewall of the machine linkage (e.g., protrusions 205 on the stick 109 configured to interlock with the second end of tether 203) of the machine 101.

Referring back to FIG. 1, machine 101 may include proximity sensor(s) 129 and positioning sensor(s) 131 placed on various parts of machine 101 (e.g., stick 109, bucket 115, etc.). The proximity sensor 129 may be implemented using a variety of techniques including rotary, laser, sonar, and/or ultrasound to determine the distance between proximity sensor 129 and a nearby object. The positioning sensor 131 may detect, in real-time or near real-time, angle, height, orientation, and/or other positions of the various movable portions of machine 101. In one instance, camera 125, proximity sensor 129, and positioning sensor 131 are communicatively connected to the control system 121; and may transmit, in real-time or near real-time, displays of blind spots with proximity and position data. In one instance, control system 121 may activate camera 125, light unit 127, proximity sensor 129, and positioning sensor 131 upon determining machine 101 is performing a task (e.g., digging, loading, and/or hauling), and may deactivate them upon completion of the task. In one instance, control system 121 may generate recommendations for camera 125 (e.g., appropriate mounting location on the machine, camera directions, etc.) based on data from proximity sensor 129 and positioning sensor 131. In one instance, control system 121 may navigate the direction of light unit 127 towards the field of view of the camera 125, while preventing the light from reaching the operator and affecting his/her visibility.

INDUSTRIAL APPLICABILITY

The disclosed system may find applicability in machines where imaging is desired. Further the disclosed system finds applicability with machines that have different desired image locations and operate in harsh environments, e.g. construction sites, mining sites, and/or large-scale excavating sites.

The camera mounting system 201 with housing 123 is attached, via magnets 301, 303, 305, and 307, to a sidewall of the machine linkage (e.g., boom 107, a stick 109) of machine 101. The camera housing 123 is configured to accommodate camera 125 to capture images (e.g. video images) of the desired environment and/or blind spots during movements of the machine linkages and/or bucket 115. For example, machine 101 may be configured with actuators 105, 111, and/or 113 (e.g., hydraulic actuators, electromechanical actuators, etc.) to move boom 107, stick 109, and bucket 115 in horizontal, vertical, and/or angular directions. The camera 125 aptly positioned within camera housing 123 may capture, in real-time or near real-time, desired views and/or blind spots during the movement of boom 107, stick 109, and/or bucket 115. As noted above, the camera housing 123 is also configured to accommodate light unit 127 for projecting a light beam toward the field-of-view of camera 125. Camera 125 and light unit 127 may be electronically coupled to the control system 121 of machine 101. The control system 121 may automatically activate camera 125 and light unit 127 upon determining machine 101 is performing a task (e.g., digging, loading, and/or hauling), and may deactivate them upon completion of the task. The camera housing 123 may effortlessly detach, via the cam lever system 401, to and from any type of machine for their protection and to have a desired field of view. The camera housing 123 also includes tether 203 which prevents the camera housing 123 from falling if impacted with a force that overpowers the grip of the magnets and detaches the camera mounting system 201 from the machine 101.

The camera housing 123 may be formed to a cubical shape with an open window to securely enclose camera 125 and light unit 127 such that no portions of camera 125 or light unit 127 extend past the window. The camera housing 123 may securely attach and detach to and from any type of machine, e.g., repositioning camera mounting system 201 from the high-risk location and to a safer location on the machine 101, or to a more desirable viewing location. As noted above, the detaching of the camera mounting system 201 from the machine 101 may be facilitated by rotation of handle 405 toward machine 101 about an axis (505b) to rotate cam 407 against machine 101 to overcome the force of magnets 301-307. The inclusion of the cam lever system 401 not only facilitates detachment of the camera mounting system 201, but also allows for use of magnets that have a strong attractive force to withstand the harsh environments and actions of machine 101.

As noted above, the camera housing 123 may facilitate a rotation or pivoting of the c-shaped sub-assembly 309 (e.g., one axis of adjustments about assembly 413e by loosening and tightening assembly 415) to provide camera 125 with a certain degree of freedom of movement. The camera housing 123 may also facilitate a rotation or pivoting of the light unit (e.g., one axis of adjustments by loosening and tightening assembly 417) for projecting a light beam toward the field-of-view of camera 125. The camera housing 123 when detached remains connected to the machine, via tether 203, so that the camera 125 is not lost or damaged.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A removable camera mounting system for a mobile industrial machine, comprising:
    a camera housing having a plurality of walls forming a cavity;
    a camera sub-housing mounted within the cavity of the camera housing;
    a camera unit mounted within the camera sub-housing;
    a light unit mounted within the cavity of the camera housing; and
    one or more magnets on an exterior of one of the plurality of walls of the camera housing for mounting the camera housing to the mobile industrial machine, wherein the camera unit and the light unit are adjustably mounted to rotate, tilt, or pivot relative to the camera housing to capture a field-of-view.

2. The removable camera mounting system according to claim 1, further comprising:
    a cam lever with a cam movable to extend beyond a sidewall having the one or more magnets.

3. The removable camera mounting system according to claim 1, further comprising:
    a tether attached to a back wall of the camera housing for securing the camera housing to a portion of a machine.

4. The removable camera mounting system according to claim 1, wherein the camera housing includes a top wall, a back wall, and two sidewalls sized to completely cover the camera unit and the light unit.

5. The removable camera mounting system according to claim 1, wherein the camera sub-housing is attached to a sidewall of the camera housing opposite to the sidewall with the one or more magnets.

6. The removable camera mounting system according to claim 5, wherein the light unit is mounted to the camera housing sidewall opposite to the sidewall with the one or more magnets.

7. The removable camera mounting system according to claim 1, wherein a sidewall with the one or more magnets is attached to a machine linkage of the mobile industrial machine, and wherein the machine linkage includes one of a boom or a stick.

8. The removable camera mounting system according to claim 1, wherein the one or more magnets have a higher clamping force than a combined weight of the camera housing.

9. A removable camera mounting assembly for a mobile industrial machine, comprising:
    a camera housing having a plurality of walls forming a cavity;
    one or more magnets on an exterior of one of the plurality of walls of the camera housing for mounting the camera housing to the mobile industrial machine;
    a camera sub-housing mounted within the cavity of the camera housing;
    a camera unit mounted within the camera sub-housing, wherein the camera unit is adjustably mounted to rotate, tilt, or pivot relative to the camera housing to capture a field-of-view; and
    a cam lever with a cam movable to extend beyond a wall having the one or more magnets.

10. The removable camera mounting assembly according to claim 9, further comprising:
    a tether attached to a back wall of the camera housing for securing the camera housing to a portion of a machine.

11. The removable camera mounting assembly according to claim 9, further comprising:
    a light unit mounted within the camera housing, wherein the light unit is mounted to a sidewall of the camera housing opposite to the sidewall with the one or more magnets.

12. The removable camera mounting assembly according to claim 11, wherein the cavity encloses the camera unit and the light unit.

13. The removable camera mounting assembly according to claim 12, wherein the camera housing includes a top wall, a back wall, and two sidewalls sized to completely cover the camera unit and the light unit.

14. The removable camera mounting assembly according to claim 9, wherein the camera sub-housing is attached to a sidewall of the camera housing opposite to the sidewall with the one or more magnets.

15. A removable camera mounting assembly, comprising:
    a camera housing having a plurality of walls forming a cavity;
    one or more magnets on an exterior of one of the plurality of walls of the camera housing for mounting the camera housing to a mobile industrial machine;
    a camera sub-housing mounted within the cavity and attached to a wall opposite to a wall with the one or more magnets;
    a light unit mounted to the camera housing, wherein the light unit is adjustably mounted to rotate, tilt, or pivot relative to the camera housing to capture a field-of-view; and
    a cam lever with a cam movable to extend beyond the wall having the one or more magnets.

16. The removable camera mounting assembly according to claim 15, further comprising:
    a tether attached to a back wall of the camera housing for securing the camera housing to a portion of a machine.

17. The removable camera mounting assembly according to claim 15 wherein the cavity encloses a camera unit and the light unit.

\* \* \* \* \*